United States Patent
Li et al.

(10) Patent No.: US 8,780,340 B2
(45) Date of Patent: Jul. 15, 2014

(54) OPTICAL TIME DOMAIN REFLECTOMETER TEST SIGNAL MODULATION CIRCUIT, AND PASSIVE OPTICAL NETWORK SYSTEM AND APPARATUS USING SAME

(71) Applicant: Huawei Technologies Co., Ltd., Guangdong (CN)

(72) Inventors: Zebin Li, Shenzhen (CN); Degang Zhong, Wuhan (CN); Shengping Li, Wuhan (CN); Changliang Yu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 3 days.

(21) Appl. No.: 13/693,657

(22) Filed: Dec. 4, 2012

(65) Prior Publication Data
US 2013/0148108 A1    Jun. 13, 2013

Related U.S. Application Data

(63) Continuation of application No. PCT/CN2011/083832, filed on Dec. 12, 2011.

(51) Int. Cl.
| | | |
|---|---|---|
| *G01N 21/00* | (2006.01) | |
| *G01J 1/04* | (2006.01) | |
| *G01J 1/42* | (2006.01) | |
| *G01J 5/08* | (2006.01) | |
| *G01M 11/00* | (2006.01) | |

(52) U.S. Cl.
CPC ...... *G01M 11/3109* (2013.01); *G01M 11/3145* (2013.01)
USPC .................................... 356/73.1; 250/227.11

(58) Field of Classification Search
None
See application file for complete search history.

(56) References Cited

U.S. PATENT DOCUMENTS

| | | | | |
|---|---|---|---|---|
| 4,730,128 A | * | 3/1988 | Seki .............................. | 327/513 |
| 4,732,469 A | * | 3/1988 | Souma ......................... | 356/73.1 |

(Continued)

FOREIGN PATENT DOCUMENTS

| | | |
|---|---|---|
| CN | 101427426 A | 5/2009 |
| CN | 101924324 A | 12/2010 |

(Continued)

OTHER PUBLICATIONS

"Information technology—Telecommunications and information exchange between systems—Local and metropolitan area networks—Specific requirements—Part 3: Carrier Sense Multiple Access with Collision Detection (CSMA/CD) access method and physical layer specifications," IEEE Standard 802.3, 2005, IEEE, New York, New York.

(Continued)

*Primary Examiner* — Gordon J Stock, Jr.
(74) *Attorney, Agent, or Firm* — Leydig, Voit & Mayer, Ltd.

(57) ABSTRACT

Embodiments of the present disclosure disclose an OTDR test signal modulation circuit, including a laser diode drive, a laser diode, a current adjusting unit, and an OTDR control unit. The laser diode drive is connected to the laser diode and is configured to drive, according to an input data signal, the laser diode to transmit data light. The current adjusting unit is connected to the laser diode and the OTDR control unit and is configured to adjust a current flowing through the laser diode according to an OTDR test signal provided by the OTDR control unit, so as to modulate the OTDR test signal to the data light transmitted by the laser diode. Moreover, the embodiments of the present disclosure also disclose a passive optical network system and apparatus.

12 Claims, 3 Drawing Sheets

(56) References Cited

U.S. PATENT DOCUMENTS

| | | | |
|---|---|---|---|
| 4,958,926 A * | 9/1990 | Bu-Abbud | 356/73.1 |
| 4,960,989 A * | 10/1990 | Liebenrood et al. | 250/227.15 |
| 5,123,732 A * | 6/1992 | Gross et al. | 356/73.1 |
| 5,801,953 A * | 9/1998 | Thoma et al. | 702/68 |
| 7,872,738 B2 | 1/2011 | Abbott | |
| 2007/0195835 A1 | 8/2007 | Randlett | |
| 2009/0232501 A1* | 9/2009 | Dai | 398/66 |
| 2011/0013904 A1 | 1/2011 | Khermosh et al. | |
| 2011/0043790 A1* | 2/2011 | Komamaki | 356/73.1 |
| 2014/0097756 A1* | 4/2014 | Zhong et al. | 315/151 |

FOREIGN PATENT DOCUMENTS

| | | |
|---|---|---|
| CN | 101958749 A | 1/2011 |
| EP | 2110970 A1 | 10/2009 |

OTHER PUBLICATIONS

"G.983.1—Series G: Transmission Systems and Media, Digital Systems and Networks; Digital sections and digital line system—Optical line systems for local and access networks: Broadband optical access systems based on Passive Optical Networks (PON)," Jan. 2006, ITU-T, Geneva, Switzerland.

"G.983.2—Series G: Transmission Systems and Media, Digital Systems and Networks; Digital sections and digital line system—Optical line systems for local and access networks: ONT management and control interface specification for B-PON," Jun. 2002, ITU-T, Geneva, Switzerland.

"G.984.1—Series G: Transmission Systems and Media, Digital Systems and Networks; Digital sections and digital line system—Optical line systems for local and access networks: Gigabit-capable Passive Optical Networks (GPON): General characteristics," Mar. 2003, ITU-T, Geneva, Switzerland.

"G.984.2—Series G: Transmission Systems and Media, Digital Systems and Networks; Digital sections and digital line system—Optical line systems for local and access networks: Gigabit-capable Passive Optical Networks (GPON): Physical Media Dependent (PMD) layer specification," Mar. 2003, ITU-T, Geneva, Switzerland.

"G.984.3—Series G: Transmission Systems and Media, Digital Systems and Networks; Digital sections and digital line system—Optical line systems for local and access networks: Gigabit-capable Passive Optical Networks (G-PON): Transmission convergence layer specification," Feb. 2004, ITU-T, Geneva, Switzerland.

"G.984.4—Series G: Transmission Systems and Media, Digital Systems and Networks; Digital sections and digital line system—Optical line systems for local and access networks: Gigabit-capable Passive Optical Networks (G-PON): ONT management and control interface specification," Jun. 2004, ITU-T, Geneva, Switzerland.

International Search Report in corresponding PCT Patent Application No. PCT/CN2011/083832 (Sep. 20, 2012).

* cited by examiner

OPTICAL TIME DOMAIN REFLECTOMETER TEST SIGNAL MODULATION CIRCUIT, AND PASSIVE OPTICAL NETWORK SYSTEM AND APPARATUS USING SAME

CROSS-REFERENCE TO RELATED APPLICATIONS

This application is a continuation of International Patent Application No. PCT/CN2011/083832, filed on Dec. 12, 2011, which is hereby incorporated by reference in its entirety.

FIELD OF THE DISCLOSURE

The present disclosure relates to optical fiber test technologies, and in particular, to an optical time domain reflectometer (OTDR) test signal modulation circuit, and a passive optical network (PON) system and apparatus using the OTDR test signal modulation circuit.

BACKGROUND OF THE DISCLOSURE

The PON system is more and more widely applied in the field of communications, therefore, services installation, acceptance test, and routine maintenance of a PON device and an optical fiber network also increase. An OTDR can play an important role in aspects such as testing, fault positioning and removal, and so on of the PON system. Therefore, how to better utilize the OTDR to improve maintenance efficiency of a passive optical network has a significant and positive meaning.

When the OTDR is used for detection of the PON system, a data transmitter may be shared to send an OTDR test signal. For example, in normal communications, a laser diode (LD) sends a data signal; and when a test is performed, a test signal is superposed on the data signal and the superposed signal is transmitted through the LD, and a reflected signal corresponding to the test signal is returned to an OTDR receiver for processing. Accordingly, the PON system is ensured to maintain a communication status during the OTDR test.

To implement sharing the data transmitter to send the OTDR test signal, in the prior art, the OTDR test signal is used to control a modulation current of an LDD (Laser Diode Drive) on the data signal. By adjusting the modulation current of the LDD, optical power of the laser diode is controlled to output a test waveform, so as to modulate the OTDR test signal to the data signal. However, a modulation bandwidth of the modulation current of the LDD is very small. As a result, a rate of the OTDR test signal is limited, and furthermore, a spatial resolution of the test of the OTDR is low. Therefore, quality of the OTDR test signal is poor.

SUMMARY OF THE DISCLOSURE

Embodiments of the present disclosure provide an OTDR test signal modulation circuit, to ensure normal communications of a data service, and meanwhile increase spatial resolution of an OTDR and improve quality of an OTDR test signal. Meanwhile, the embodiments of the present disclosure also provide a PON system and apparatus that adopt the OTDR test signal modulation circuit.

An embodiment of the present disclosure first provides an OTDR test signal modulation circuit, including a laser diode drive, a laser diode, a current adjusting unit, and an OTDR control unit. The laser diode drive is connected to the laser diode and configured to drive, according to an input data signal, the laser diode to transmit data light. The current adjusting unit is connected to the laser diode and the OTDR control unit and configured to adjust a current flowing through the laser diode according to an OTDR test signal provided by the OTDR control unit, so as to modulate the OTDR test signal to the data light transmitted by the laser diode.

An embodiment of the present disclosure further provides an optical transceiver component, including an optical transmitting module and an OTDR test module. The optical transmitting module includes a laser diode, a laser diode drive, and a current adjusting unit. The OTDR test module includes an OTDR control unit. The laser diode, the laser diode drive, the current adjusting unit, and the OTDR control unit form, through connection, the foregoing OTDR test signal modulation circuit.

An embodiment of the present disclosure further provides a passive optical network system, including an optical line terminal, an optical distribution network, and a plurality of optical network units. The optical line terminal is connected to the multiple optical network units in a point-to-multipoint manner through the optical distribution network. The optical line terminal has an optical transceiver component with an OTDR test function, and the optical transceiver component includes the foregoing OTDR test signal modulation circuit.

An embodiment of the present disclosure further provides a passive optical network apparatus, including an optical transceiver component and a data processing module. The data processing module is configured to process a data signal. The optical transceiver component is configured to transmit the data signal provided by the data processing module and provides a received data signal for the data processing module. The optical transceiver component is integrated with an OTDR test function and includes the foregoing OTDR test signal modulation circuit.

The OTDR test signal modulation circuit and apparatus provided in the embodiments of the present disclosure directly modulate the laser diode by using the data signal and the OTDR test signal simultaneously, and thus it is unneeded to modulate the OTDR test signal to a modulation current of the LDD. Therefore, the OTDR test signal modulation circuit provided in the embodiments of the present disclosure is not limited by a modulation bandwidth of the modulation current of the LDD, thereby increasing a rate of the OTDR test signal, and further increasing the spatial resolution of the OTDR, and improving the quality of the OTDR test signal while ensuring normal communications of the data service.

BRIEF DESCRIPTION OF THE DRAWINGS

To illustrate the technical solutions in the embodiments of the present disclosure or in the prior art more clearly, the following briefly describes accompanying drawings required for describing the embodiments or the prior art. Obviously, the accompanying drawings in the following description are merely specification of the prior art and are some embodiments of the present disclosure, and persons of ordinary skill in the art may obtain other drawings from these accompanying drawings without making creative efforts.

DETAILED DESCRIPTION OF THE EMBODIMENTS

To make the objectives, technical solutions and advantages of the present disclosure more clear, the following further describes the present disclosure in detail with reference to the accompanying drawings. The exemplary embodiments of the present disclosure and their description are used for explaining the present disclosure, but are not a limit to the present disclosure.

Figure 1:
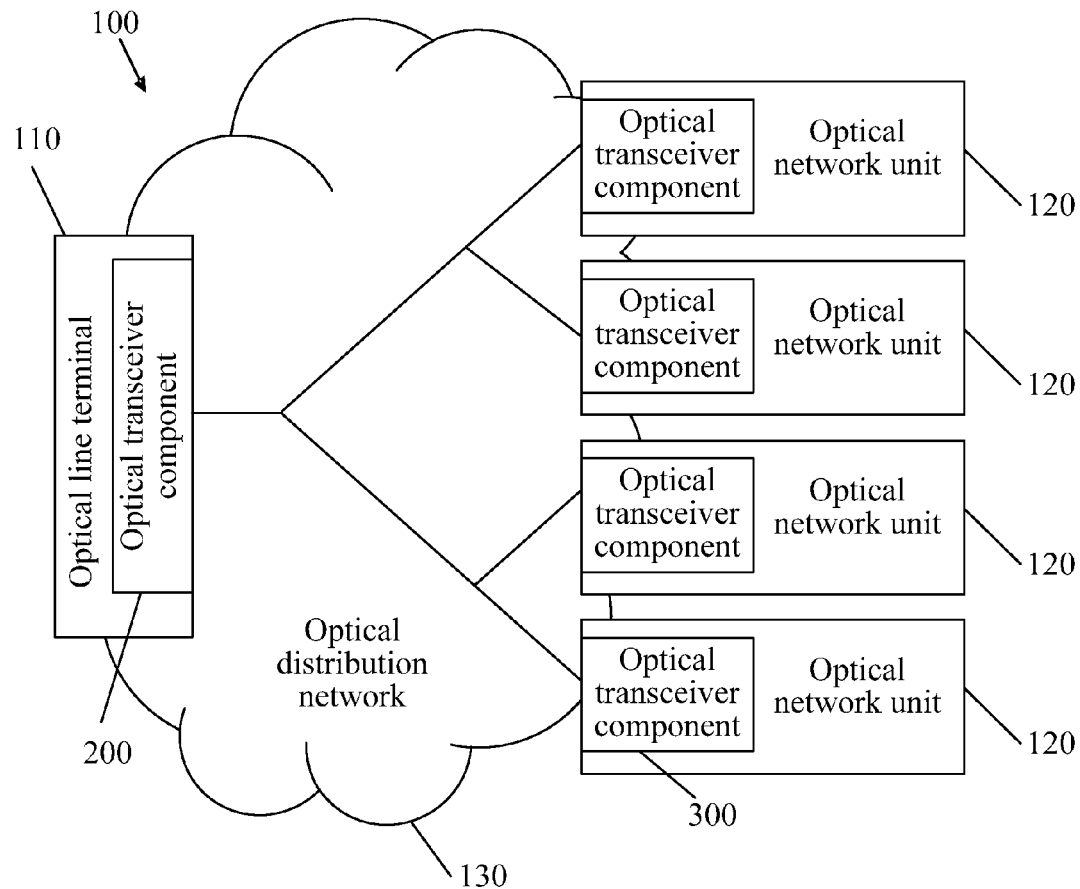
FIG. 1 is a schematic structural diagram of a passive optical network system to which an OTDR test signal modulation circuit may be applicable according to an embodiment of the present disclosure.

Referring to FIG. 1, a schematic diagram of network architecture of a passive optical network (PON) system to which an optical transceiver component may be applicable according to the present application is shown. The passive optical network system 100 includes at least one optical line terminal (OLT) 110, a plurality of optical network units (ONU) 120, and an optical distribution network (ODN) 130. The optical line terminal 110 is connected, through the optical distribution network 130, to the optical network units 120 in a point-to-multipoint manner. The optical line terminal 110 may communicate with the optical network unit 120 by using a TDM mechanism, a WDM mechanism or a combined mechanism of TDM and WDM. A direction from the optical line terminal 110 to the optical network unit 120 is defined as a downstream direction, and a direction from the optical network unit 120 to the optical line terminal 110 is defined as an upstream direction.

The passive optical network system 100 may be a communication network which implements data distribution between the optical line terminal 110 and the optical network unit 120 without the need of any active component. In a specific embodiment, the data distribution between the optical line terminal 110 and the optical network unit 120 may be implemented through a passive optical component (for example, an optical splitter) in the optical distribution network 130. The passive optical network system 100 may be an asynchronous transfer mode passive optical network (ATM PON) system or a broadband passive optical network (BPON) system defined in an ITU-T G.983 standard, a gigabit passive optical network (GPON) system defined in an ITU-T G.984-series standards, an Ethernet passive optical network (EPON) defined in an IEEE 802.3ah standard, a wavelength division multiplexing passive optical network (WDM PON) system, or a next generation passive optical network (NGA PON system, such as an XGPON system defined in an ITU-T G.987-series standards, a 10G EPON system defined in an IEEE 802.3av standard, or a TDM/WDM combined PON system and so on), all of which are incorporated herein by reference in their entirety.

The optical line terminal 110 is usually located in a central position (for example, a central office), and may manage the optical network units 120 in a unified manner. The optical line terminal 110 may serve as a medium between the optical network unit 120 and an upper level network (not shown), to forward data received from the upper level network as downstream data to the optical network unit 120 and forward upstream data received from the optical network unit 120 to the upper level network. Specific configuration of the optical line terminal 110 may vary according to a specific type of the passive optical network 100. In an embodiment, the optical line terminal 110 may include an optical transceiver component 200 and a data processing module (not shown). The optical transceiver component 200 may convert downstream data processed by the data processing module into a downstream optical signal, send the downstream optical signal to the optical network unit 120, through the optical distribution network 130, receive an upstream optical signal sent by the optical network unit 120 through the optical distribution network 130, convert the upstream data signal into an electrical signal and provide the electrical signal for the data processing module for processing.

The optical network units 120 may be distributed at user sides (for example, user premises). The optical network unit 120 may be a network device configured to perform communications with the optical line terminal 110 and a user. Specially, the optical network unit 120 may serve as a medium between the optical line terminal 110 and the user, for example, the optical network unit 120 may forward downstream data received from the optical line terminal 110 to the user and forward data received from the user as upstream data to the optical line terminal 110. Specific configuration of the optical network unit 120 may vary according to a specific type of the passive optical network 100. In an embodiment, the optical network unit 120 may include an optical transceiver component 300. The optical transceiver component 300 is configured to receive a downstream data signal sent by the optical line terminal 110 through the optical distribution network 130, and send an upstream data signal to the optical line terminal 110, through the optical distribution network 130. It should be understood that structure of the optical network unit 120 is similar to that of an optical network terminal (ONT), and therefore, the optical network unit and the optical network terminal are interchangeable in the present application.

The optical distribution network 130 may be a data distribution system, and may include optical fibers, optical couplers, optical multiplexers/demultiplexers, optical splitters, and/or other devices. In an embodiment, the optical fibers, the optical couplers, the optical multiplexers/demultiplexers, the optical splitters, and/or the other devices may be passive optical components. Specifically, the optical fibers, the optical couplers, the optical multiplexers/demultiplexers, the optical splitters, and/or the other devices may be components that do not require any power to distribute data signals between the optical line terminal 110 and the optical network units 120. Furthermore, in another embodiment, the optical distribution network 130 may further include one or more processing devices, for example, an optical amplifier or a relay device. In a branch structure as shown in FIG. 1, the optical distribution network 130 may typically extend from the optical line terminal 110 to the multiple optical network units 120, but may be alternatively configured as any other point-to-multipoint configuration.

The optical transceiver component 200 or 300 may be a pluggable optical transceiver component in which an optical signal transceiver function, an optical-to-electrical conversion function and an OTDR test function are integrated. Taking the optical transceiver component 200 applied in the optical line terminal 110 as an example, the optical transceiver component may include an optical transmitting module 210, an optical receiving module 220, and an OTDR test module 230. The optical transmitting module 210 is configured to deliver a downstream data signal to the optical network unit 120 through the optical distribution network 130, and when an optical fiber network and a PON device need to be tested, modulate the OTDR test signal to the downstream data signal according to an OTDR test control signal provided by the OTDR test module 230, and output the downstream data signal to the optical distribution network 130. The optical receiving module 220 is configured to receive an upstream data signal which comes from the optical network unit 120 and is transmitted through the optical distribution network 130, convert the upstream data signal into an electrical signal through optical-to-electrical conversion, and forward the electrical signal to a control module or the data processing module (not shown) of the optical line terminal 110 for processing. The OTDR test module 230 is configured to provide an OTDR test control signal for the optical transmitting module 210 during a test, so as to control the transmitting module to modulate the OTDR test signal to the downstream data signal, and detect a reflected signal returned by reflection of the OTDR test signal in the optical distribution network 130 or the optical network unit 120. In a specific embodiment, the OTDR test signal and the OTDR test control signal may be the same signal provided by the OTDR test module.

Figure 2:
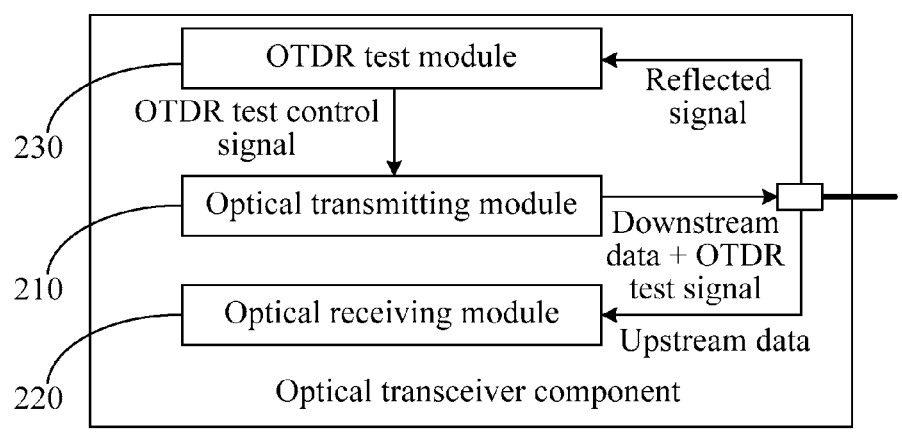
FIG. 2 is a schematic diagram of receiving of an optical transceiver component of the passive optical network system shown in FIG. 1.
Figure 3:
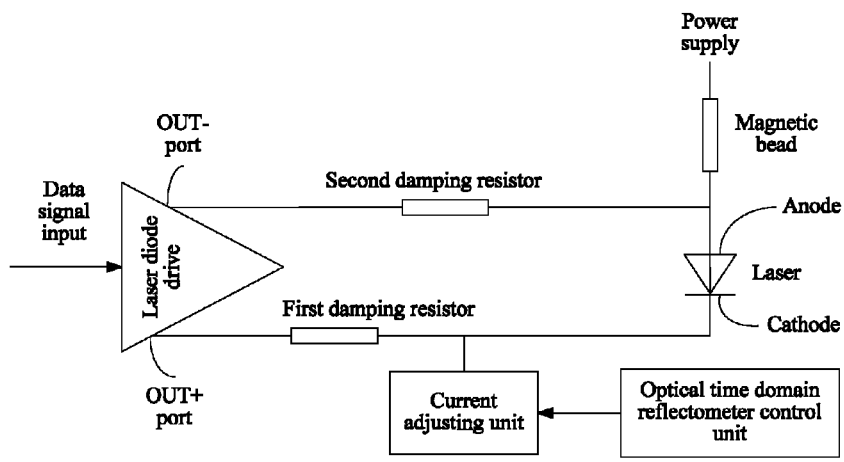
FIG. 3 is a schematic diagram of an OTDR test signal modulation circuit according to an embodiment of the present disclosure.

To enable the optical transceiver component to modulate an OTDR test signal to a data signal and output the data signal to the optical distribution network, an embodiment of the present disclosure provides an OTDR test signal modulation circuit. As shown in FIG. 3, the OTDR test signal modulation circuit includes a laser diode drive LDD, a laser diode LD, a current adjusting unit, and an OTDR control unit. In a specific embodiment, for example, when being applied in the optical transceiver component as shown in FIG. 2, optionally, the LDD, the LD, and the current adjusting unit may be disposed in the optical transmitting unit 210 of the optical transceiver component, and the OTDR control unit may be disposed in the OTDR test module 230 of the optical transceiver component. Definitely, it should be understood that the LDD, the LD, the current adjusting unit, and the OTDR control unit may alternatively be disposed in a same functional module, for example, the optical transmitting module 210.

The LDD is configured to convert a high-speed data signal into a high-speed current signal and further drive the LD to emit light. The LD is a direct-modulate mode laser diode and is a light emitting component, and output optical power of the LD changes with a current flowing through the LD. When the data signal is bit 1, the current flowing through the LD increases and the output optical power becomes greater; and when the modulation signal is bit 0, the current flowing through the LD decreases and the output optical power becomes smaller. The current adjusting unit is a controlled current source, and a current flowing through the current adjusting unit is controlled by an external control signal (for example, an OTDR test signal provided by the OTDR control unit). The current adjusting unit may adjust the current flowing through the LD according to the OTDR test signal provided by the OTDR control unit, so as to modulate the OTDR test signal to the data light transmitted by the LD. The OTDR control unit is configured to control a rate and a code type of the OTDR test signal and provide the OTDR test signal for the current adjusting unit.

An OUT− port of the LDD is connected to an anode of the LD through a second damping resistor, and an OUT+ port of the LDD is connected to a cathode of the LD through a first damping resistor; the anode of the laser diode is connected to a power supply through a magnetic bead, an output end of the OTDR control unit is connected to the current adjusting unit, and an input end of the current adjusting unit is connected to the cathode of the LD. The first damping resistor and the second damping resistor are configured to decrease ringing of the LD, and the magnetic bead is configured to isolate high-speed signals of the power supply and the LD and allow a low-frequency signal to pass through.

The data signal enters the LDD through an input end of the LDD, and after amplification and conversion in the LDD, drives a current of an internal current source of the LDD to flow through two output ends of the LDD. When the data signal is "1", a current flowing from the power supply passes the following path: the magnetic bead-the anode of the LD-the cathode of the LD-the first damping resistor-the OUT+ port of the LDD, and flows into the LDD at last. At this time, being driven by the current, the LD emits light, and therefore has output optical power of a certain value. If the LD outputs a data signal "0" at a previous status, the output optical power of the LD increases at this time; and when the data signal input into the LDD is "0", the current flowing from the power supply passes the following path: the magnetic bead-the second damping resistor-the OUT− port of the LDD. It may be seen that the current at this time does not flow through the LD and the LD stops emitting light. If the LD outputs the data signal "1" at the previous status, the output power of the LD decreases at this time. It may be seen from the foregoing description that, in the OTDR test signal modulation circuit provided in the embodiment of the present disclosure, an input data signal of the LDD may control whether the current flows through the LD and further control optical power of the LD, and achieve an objective of modulating the LD by the data signal.

The OTDR test signal output by the OTDR control unit controls whether the current adjusting unit provides a controlled current. When the test signal is "1", the current adjusting unit provides a controlled current; at this time, the input current of the current adjusting unit increases, and the current flowing through the LD increases accordingly, that is, the output power of the LD increases. When the test signal is "0", the current adjusting unit stops providing a controlled current; at this time, the input current of the current adjusting unit decreases, and the current flowing through the LD decreases accordingly, that is, the output power of the LD decreases. It may be seen from the foregoing description, the OTDR test signal modulation circuit provided in the embodiment of the present disclosure controls, through the OTDR test signal, the increase or decrease of the input current of the current adjusting unit, and further controls the optical power of the LD, thereby achieving the objective of modulating the OTDR test signal to the data light transmitted by the LD.

It may be seen from the foregoing illustration that, the OTDR test signal modulation circuit provided in the embodiment of the present disclosure may directly modulate an LD by using the data signal and the OTDR test signal simultaneously, and does not need to modulate the OTDR test signal to a modulation current of the LDD. Therefore, the OTDR test signal modulation circuit provided in the embodiment of the present disclosure is not limited by a modulation bandwidth of the modulation current of the LDD, thereby increasing the rate of the OTDR test signal and further increasing spatial resolution of an OTDR, and improving quality of the OTDR test signal while ensuring normal communications of a data service.

To better understand the OTDR test signal modulation circuit provided in the embodiment of the present disclosure, the system is described in detail in the following with reference to the accompanying drawings.

Figure 4:
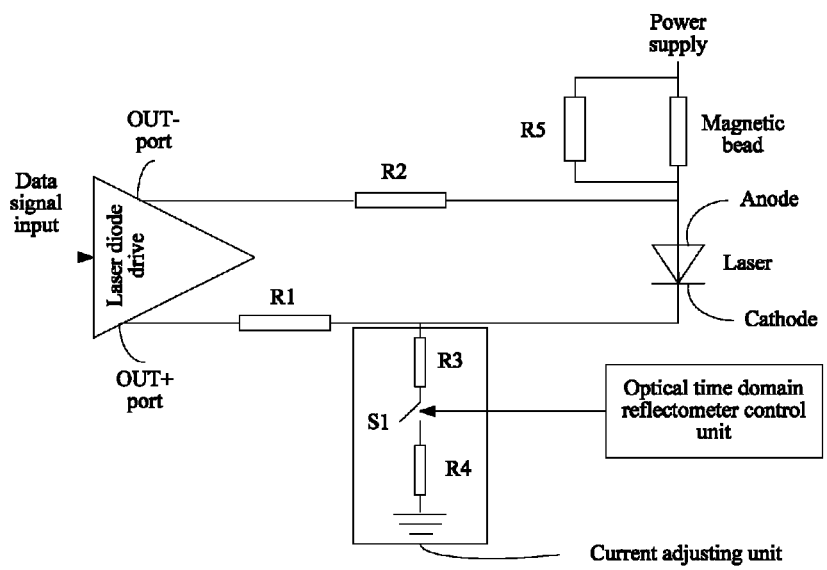
FIG. 4 is a schematic diagram of an OTDR test signal modulation circuit according to an embodiment of the present disclosure.

As shown in FIG. 4, an OTDR test signal modulation circuit provided in the embodiment of the present disclosure includes a laser diode drive LDD, a laser diode LD, a current adjusting unit, an OTDR control unit, a magnetic bead, and three damping resistors R1, R2, and R5. The current adjusting unit includes a series-connected branch circuit formed by two damping resistors (R3 and R4) and a single-pole single-throw switch S1. The damping resistor R5 and the magnetic bead are connected in parallel to decrease a quality factor value of the magnetic bead and improve signal quality of an OTDR re-modulated signal.

An OUT− port of the LDD is connected to an anode of the LD through the damping resistor R2, another output end OUT+ of the LDD is connected to a cathode of the LD through the damping resistor R1, the anode of the LD is connected to a power supply through the magnetic bead and the damping resistor R5 which are connected in parallel, an output end of the OTDR control unit is connected to a control end of the single-pole single-throw switch S1 between the damping resistors R3 and R4, the damping resistor R3 is connected to the cathode of the LD and a closed end of the single-pole single-throw switch S1, and a fixed end of the single-pole single-throw switch S1 is grounded through the damping resistor R4. The OTDR control unit outputs an OTDR test signal to control opening and closing of the single-pole single-throw switch S1.

In a specific embodiment, when an OTDR test does not need to be performed, the OTDR test control unit does not output the OTDR test signal to the current adjusting unit, and at this time, the single-pole single-throw switch S1 is in an open status. When the OTDR test needs to be performed, the OTDR test control unit outputs the OTDR test signal to the current adjusting unit, and the OTDR test signal may control the single-pole single-throw switch S1 to be closed, so that the series-connected branch circuit of the current adjusting unit is enabled.

A specific working process of the OTDR test signal modulation circuit is described in detail in the following. When a data signal input into the LDD is "1" and the OTDR test signal output by the OTDR control unit makes the single-pole single-throw switch S1 closed, one part of a current flowing from the power supply flows into the LDD from the OUT+ port of the LDD, and another part of the current flows through the enabled branch circuit formed by R3, S1, and R4. At this time, a flowing direction of the current is:

$$\frac{\text{Magnetic bead}}{R5} - \text{Anode of } LD - \text{Cathode of } LD \begin{cases} R1 - \text{OUT} + \text{port of } LDD - LDD \\ R3 - S1 - R4. \end{cases}$$

At this time, the enablement of the series-connected branch circuit of the current adjusting unit under the control of the OTDR test signal is equivalent to provision of a controlled current. Therefore, a greater current flows through the LD, and output optical power of the LD is greater.

When the data signal input into the LDD is "1" and the OTDR control unit makes the single-pole single-throw switch S1 opened, the series-connected branch circuit formed by R3, S1, and R4 of the current adjusting unit is disabled, which is equivalent to removal of the controlled current. Therefore, the current flowing from the power supply only flows into the LDD from the OUT+ port of the LDD. At this time, the flowing direction of the current is: the magnetic bead/R5-the anode of the LD-the cathode of the LD-R1-the OUT+ port of the LDD-LDD. It may be seen that at this time, the current flowing through the LD is smaller, and the output optical power of the LD is smaller.

When the data signal input into the LDD is "0" and the OTDR test signal output by the OTDR control unit makes the single-pole single-throw switch S1 closed, in one aspect, one part of the current flowing from the power supply flows into the LDD from the OUT− port of the LDD, and in anther aspect, since the series-connected branch circuit formed by R3, S1, and R4 is enabled, another part of the current, after flowing through the LD, flows through the enabled branch circuit formed by R3, R4, and S1. At this time, the flowing direction of the current is:

$$\frac{\text{Magnetic bead}}{R5} - \begin{cases} R2 - \text{OUT} - \text{port of } LDD - LDD \\ \text{Anode of } LD - \text{Cathode of } LD - R3 - S1 - R4. \end{cases}$$

At this time, it is equivalent to that the current adjusting unit provides a controlled power supply to make a current flow through the LD. Therefore, the LD may still emit light; however, since the data signal is "0" at this time, the current flowing through the LD is smaller and the output optical power of the LD is smaller. Therefore, in the embodiment, even though the data signal is "0", the OTDR test signal modulation circuit may still modulate the OTDR test signal to the emitted light of the LD, so as to implement the OTDR test.

When the data signal input into the LDD is "0" and the OTDR control unit makes the single-pole single-throw switch S1 opened, the branch circuit formed by R3, S1, and R4 is disabled, and the current flowing from the power supply flows into the LDD from the OUT− port of the LDD. At this time, the flowing direction of the current is: the magnetic bead/R5-R2-the OUT− port of the LDD-LDD. At this time, no current flows through the LD, and the output optical power of the LD is 0.

Figure 5:
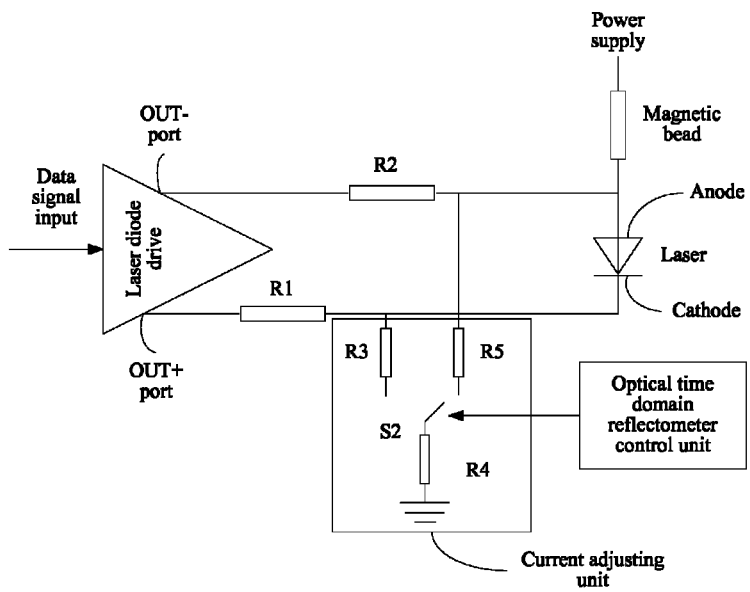
FIG. 5 is a schematic diagram of an OTDR test signal modulation circuit according to another embodiment of the present disclosure.

FIG. 5 is a schematic diagram of an OTDR test signal modulation circuit according to another embodiment of the present disclosure. The OTDR test signal modulation circuit provided in this embodiment is similar to the OTDR test signal modulation circuit as shown in FIG. 4; however, the circuit configuration and a connection manner of a current adjusting unit have some difference.

In this embodiment, the current adjusting unit includes damping resistors R3, R4 and R5, and a single-pole double-throw switch S2. A fixed end of the single-pole double-throw switch S2 is grounded through the damping resistor R4, one closed end of the single-pole double-throw switch S2 is connected to an anode of an LD through the damping resistor R5, another closed end is connected to a cathode of the LD through the damping resistor R3, and a control end of the single-pole double-throw switch S2 is connected to an OTDR control unit. An OTDR test signal output by the OTDR control unit to the control end of the single-pole double-throw switch S2 may control the fixed end of the single-pole double-throw switch S2 to be connected to the damping resistor R3 or the damping resistor R5.

When an OTDR test does not need to be performed, the OTDR test control unit does not output the OTDR test signal to the current adjusting unit. At this time, the fixed end of the single-pole double-throw switch S2 is connected to the damping resistor R5, so that a series-connected branch circuit formed by the damping resistors R5 and R4 in the current adjusting unit is enabled. When the OTDR test needs to be performed, the OTDR test control unit outputs the OTDR test signal to the current adjusting unit, and the fixed end of the single-pole double-throw switch S2 is connected to the damping resistor R3, so that a series-connected branch circuit formed by the damping resistors R3 and R4 in the current adjusting unit is enabled.

When a data signal input into an LDD is "1" and the OTDR test signal output by the OTDR control unit enables the fixed end of the single-pole double-throw switch S2 to be connected to the damping resistor R3, a current flowing from the power supply flows into the LDD from an OUT+ port of the LDD, and another part of the current flows through the enabled branch circuit formed by R3, R4, and S2. At this time, a flowing direction of the current is:

Magnetic bead – Anode of $LD$ –

$$\text{Cathode of } LD \begin{cases} R1 - \text{OUT} + \text{port of } LDD - LDD \\ R3 - S2 - R4. \end{cases}$$

At this time, it is equivalent to that the current adjusting unit provides a controlled current. Therefore, a greater current flows through the LD, and output optical power of the LD is greater.

When the data signal input into the LDD is "1" and the OTDR control unit enables the fixed end of the single-pole double-throw switch S2 to be connected to the damping resistor R5, one part of the current flows into the LDD from the OUT+ port of the LDD, and another part of the current flows through the enabled branch circuit formed by R5, S2, and R4. At this time, the flowing direction of the current is:

Magnetic bead –

$$\begin{cases} \text{Anode of } LD - \text{Cathode of } LD - R1 - \text{OUT} + \text{port of } LDD - LDD \\ R5 - S2 - R4. \end{cases}$$

It may be seen that at this time, a current flows through the LD; however, due to current division of the enabled branch circuit formed by R5, S2, and R4, the current flowing through the LD is smaller and the output optical power of the LD is smaller.

When the data signal input into the LDD is "0" and the OTDR test signal output by the OTDR control unit enables the fixed end of the single-pole double-throw switch S2 to be connected to the damping resistor R3, one part of the current flowing from the power supply flows into the LDD from an OUT– port of the LDD, and another part of the current flows through the enabled branch circuit formed by R3, S2, and R4. At this time, the flowing direction of the current is:

$$\text{Magnetic bead} \begin{cases} \text{Anode of } LD - \text{Cathode of } LD - R3 - S2 - R4 \\ R2 - \text{OUT} - \text{port of } LDD - LDD. \end{cases}$$

It may be seen that at this time, although the data signal is "0", it is equivalent to that the current adjusting unit provides a controlled power supply, so that a current flows through the LD. However, the current flowing through the LD is smaller, and the output optical power of the LD is smaller. Therefore, in the embodiment, even though the data signal is "0", the OTDR test signal may still be modulated to the emitted light of the LD, so as to implement the OTDR test.

When the data signal input into the LDD is "0" and the OTDR control unit enables the fixed end of the single-pole double-throw switch S2 to be connected to the damping resistor R5, one part of the current flowing from the power supply flows into the LDD from the OUT– port of the LDD, and another part of the current flows through the enabled branch circuit formed by R5, S2, and R4. At this time, the flowing direction of the current is:

$$\text{Magnetic bead} \begin{cases} R5 - S2 - R4 \\ R2 - \text{OUT} - \text{port of } LDD - LDD. \end{cases}$$

It may be seen that at this time, no current flows through the laser diode, and the output optical power of the laser diode is 0.

Figure 6:
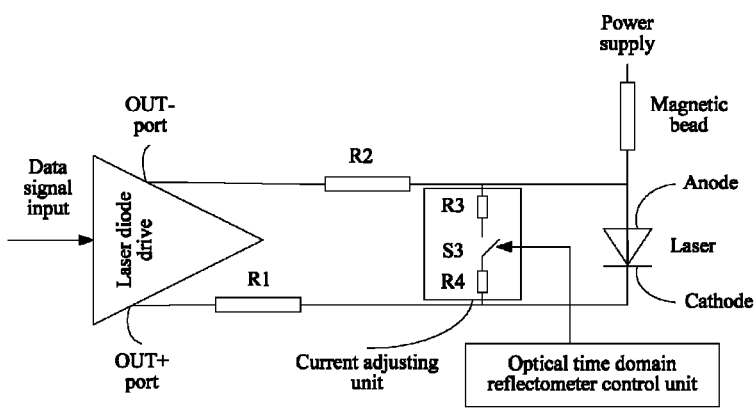
FIG. 6 is a schematic diagram of an OTDR test signal modulation circuit according to a third embodiment of the present disclosure.

FIG. 6 is a schematic diagram of an OTDR test signal modulation circuit according to a third embodiment of the present disclosure. The OTDR test signal modulation circuit provided in this embodiment is similar to the structure of the OTDR test signal modulation circuit as shown in FIG. 4; however, circuit configuration and a connection manner of a current adjusting unit have some difference.

In this embodiment, the current adjusting unit includes damping resistors R3 and R4, and a single-pole single-throw switch S3. A closed end of the single-pole single-throw switch S3 is connected to an anode of an LD through the damping resistor R3, a fixed end of the single-pole single-throw switch S3 is connected to a cathode of the LD through the damping resistor R4, and an OTDR control unit is connected to a control end of the single-pole single-throw switch S3 and configured to control, through an OTDR test signal, the opening or closing of the single-pole single-throw switch S3.

When a data signal input into an LDD is "1" and the OTDR control unit makes the single-pole single-throw switch S3 opened, a current flowing from a power supply flows into the LDD through an OUT+ port of the LDD. At this time, a flowing direction of the current is: a magnetic bead-the anode of the LD-the cathode of the LD-R1-the OUT+ port of the LDD-LDD. Therefore, the modulation current of the LDD entirely flows through the laser diode, and output optical power of the laser diode is greater.

When the data signal input into the LDD is "1" and the OTDR test signal output by the OTDR control unit makes the single-pole single-throw switch S3 closed, one part of the current flowing from the power supply flows through an enabled branch circuit formed by R3, S3, and R4, and another part of the current enters the LDD through the LD. At this time, the flowing direction of the current is:

Magnetic bead $$\begin{cases} R3 - S3 - R4 - \text{OUT} + \text{port of } LDD - LDD \\ \text{Anode of } LD - \text{Cathode of } LD - R1 - OUT + \text{port of } LDD - LDD. \end{cases}$$

It may be seen that, when the single-pole single-throw switch S3 is closed, the series-connected branch circuit formed by R3, S3, and R4 is enabled. Since the series-connected branch circuit is connected to the LD in parallel and divides a current flowing through the LD, it is equivalent to that the current adjusting unit provides a negative controlled current. Therefore, the current flowing through the LD decreases, and the output optical power of the LD also decreases.

When the data signal input into the LDD is "0" and the OTDR control unit makes the single-pole single-throw switch S3 disconnected, the current flowing from the power supply flows into the LDD from an OUT− port of the LDD. At this time, the flowing direction of the current is: the magnetic bead-R2-the OUT− port of the LDD-LDD. In this case, no current flows through the LD, and the output optical power of the LD is 0.

When the data signal input into the LDD is "0" and the OTDR test signal output by the OTDR control unit makes the single-pole single-throw switch S3 closed, although the series-connected branch circuit formed by R3, S3, and R4 is enabled, the OUT+ port connected to the other end of the series-connected branch circuit cannot provide a loop. Therefore, no current flows through the series-connected branch circuit, and the current merely flows into the LDD from the OUT− port of the LDD. At this time, the flowing direction of the current is: the magnetic bead-R2-the OUT− port of the LDD-LDD. It may be seen that in this case, no current flows through the LD, and the output optical power of the LD is 0.

It may be seen from the foregoing description that, the OTDR test signal modulation circuit provided in the embodiments of the present disclosure may directly modulate the LD by using the data signal and the OTDR test signal simultaneously, and does not need to modulate the OTDR test signal to a modulation current of the LDD. Therefore, the OTDR test signal modulation circuit provided in the embodiments of the present disclosure is not limited by a modulation bandwidth of the modulation current of the LDD, thereby increasing a rate of the OTDR test signal, further increasing spatial resolution of the OTDR, and improving quality of the OTDR test signal while ensuring normal communications of a data service.

It may be known from the foregoing illustration that, the optical time domain reflectometer test signal modulation apparatus provided in the embodiment of the present disclosure may also achieve effects of increasing the spatial resolution of the optical time domain reflectometer and improving the quality of the optical time domain reflectometer test signal while ensuring normal communications of the data service.

Through the description of the foregoing implementation manners, persons skilled in the art may be clearly aware that the present disclosure may be implemented through software in addition to a necessary hardware platform, and also may be implemented all through hardware. Based on such understanding, all of or the part of the technical solutions in the present disclosure that contribute to the prior art may be embodied in a form of a software product. The computer software product may be stored in a storage medium, such as a ROM/RAM, a magnetic disk, a compact disk and so on, and includes several instructions for instructing a computer device (which may be a personal computer, a server, or a network device, and the like) to execute the methods described in each embodiment of the present disclosure or in certain parts of the embodiments.

The foregoing descriptions are merely specific implementation manners of the present disclosure, but are not intended to limit the protection scope of the present disclosure. Any variation or replacement that is readily conceivable to persons skilled in the art without departing from the technical scope of the present disclosure shall fall within the protection scope of the present disclosure. Therefore, the protection scope of the present disclosure shall be subject to the appended claims.

What is claimed is:

1. An optical time domain reflectometer (OTDR) test signal modulation circuit, comprising: a laser diode drive, a laser diode, a current adjusting unit, and an OTDR control unit; wherein the laser diode drive is connected to the laser diode, and is configured to drive the laser diode to transmit data light according to an input data signal; and the current adjusting unit is connected to the laser diode and the OTDR control unit, and is configured to adjust a current flowing through the laser diode according to an OTDR test signal provided by the OTDR control unit, so as to modulate the OTDR test signal to the data light transmitted by the laser diode, wherein the current adjusting unit comprises a first resistor, a controlled switch, and a second resistor; the first resistor, the controlled switch, and the second resistor are serially connected to form a series-connected branch circuit; a first connection end of the controlled switch is connected to the laser diode through the first resistor, a second connection end of the controlled switch is grounded through the second resistor, a control end of the controlled switch is connected to the OTDR control unit, and the controlled switch is configured to control an opening/closing status of the series-connected branch circuit according to the OTDR test signal provided by the OTDR control unit.

2. The OTDR test signal modulation circuit according to claim 1, wherein the current adjusting unit serves as a controlled current source to provide a controlled current for the laser diode when receiving the OTDR test signal provided by the OTDR control unit, and adjusts output optical power of the laser diode through the controlled current, so as to modulate the OTDR test signal to the data light transmitted by the laser diode.

3. The OTDR test signal modulation circuit according to claim 1, wherein the current adjusting unit is connected to a cathode of the laser diode, and an anode of the laser diode is connected to a power supply; when the OTDR control unit provides the OTDR test signal for the current adjusting unit, if the data signal is "1", after a current flowing from the power supply flows through the laser diode, one part of the current flows into the laser diode drive, and another part of the current flows into the current adjusting unit; and if the data signal is "0", one part of the current flowing from the power supply directly flows into the laser diode drive, and another part flows into the current adjusting unit through the laser diode.

4. The OTDR test signal modulation circuit according to claim 2, wherein when the OTDR control unit outputs the OTDR test signal to the current adjusting unit, the current adjusting unit modulates the OTDR test signal to the data light transmitted by the laser diode through the controlled current when the data signal is "0" and "1".

5. The OTDR test signal modulation circuit according to claim 3, wherein the current adjusting unit is connected to the cathode of the laser diode, and the anode of the laser diode is connected to the power supply; when the OTDR control unit does not provide the OTDR test signal for the current adjusting unit, if the data signal is "1", one part of the current flowing from the power supply flows into the laser diode drive through the laser diode, and another part of the current flows into the current adjusting unit; and if the data signal is "0", one part of the current flowing from the power supply directly flows into the laser diode drive, and another part flows into the current adjusting unit.

6. An optical time domain reflectometer (OTDR) test signal modulation circuit, comprising: a laser diode drive, a laser diode, a current adjusting unit, and an OTDR control unit; wherein the laser diode drive is connected to the laser diode, and is configured to drive the laser diode to transmit data light according to an input data signal; and the current adjusting unit is connected to the laser diode and the OTDR control unit, and is configured to adjust a current flowing through the laser diode according to an OTDR test signal provided by the OTDR control unit, so as to modulate the OTDR test signal to the data light transmitted by the laser diode, wherein the current adjusting unit comprises a first resistor, a controlled switch, and a second resistor; the first resistor, the controlled switch, and the second resistor are serially connected to form a series-connected branch circuit; the series-connected branch circuit is connected to the laser diode in parallel, and the controlled switch is configured to control an opening/closing status of the series-connected branch circuit according to the OTDR test signal provided by the OTDR control unit.

7. The OTDR test signal modulation circuit according to claim 6, wherein the controlled switch is a single-pole single-throw switch, a fixed end of the single-pole single-throw switch serves as the first connection end, and a closed end of the single-pole single-throw switch serves as the second connection end.

8. A passive optical network apparatus, comprising:
an optical transceiver component comprising a laser diode drive, a laser diode, a current adjusting unit, and an OTDR control unit;
wherein the laser diode drive is connected to the laser diode, and is configured to drive the laser diode to transmit data light according to an input data signal;
the current adjusting unit is connected to the laser diode, and is configured to modulate an OTDR test signal to the data light transmitted by the laser diode by adjusting a current flowing through the laser diode, wherein the OTDR control unit is configured to provide the OTDR test signal for the current adjusting unit, wherein the current adjusting unit comprises a first resistor, a controlled switch, and a second resistor; the first resistor, the controlled switch, and the second resistor are serially connected to form a series-connected branch circuit; a first connection end of the controlled switch is connected to the laser diode through the first resistor, a second connection end of the controlled switch is grounded through the second resistor, a control end of the controlled switch is connected to the OTDR control unit, and the controlled switch is configured to control an opening/closing status of the series-connected branch circuit according to the OTDR test signal provided by the OTDR control unit.

9. The passive optical network apparatus according to claim 8, wherein the current adjusting unit serves as a controlled current source to provide a controlled current for the laser diode when receiving the OTDR test signal provided by the OTDR control unit, and adjusts output optical power of the laser diode through the controlled current, so as to modulate the OTDR test signal to the data light transmitted by the laser diode.

10. The passive optical network apparatus according to claim 8, wherein the current adjusting unit is connected to a cathode of the laser diode, and an anode of the laser diode is connected to a power supply; when the OTDR control unit provides the OTDR test signal for the current adjusting unit, if the data signal is "1", after a current flowing from the power supply flows through the laser diode, one part of the current flows into the laser diode drive, and another part of the current flows into the current adjusting unit; and if the data signal is "0", one part of the current flowing from the power supply directly flows into the laser diode drive, and another part flows into the current adjusting unit through the laser diode.

11. The passive optical network apparatus according to claim 10, wherein the current adjusting unit is connected to the cathode of the laser diode, and the anode of the laser diode is connected to the power supply; when the OTDR control unit does not provide the OTDR test signal for the current adjusting unit, if the data signal is "1", one part of the current flowing from the power supply flows into the laser diode drive through the laser diode, and another part of the current flows into the current adjusting unit; and if the data signal is "0", one part of the current flowing from the power supply directly flows into the laser diode drive, and another part flows into the current adjusting unit.

12. A passive optical network apparatus, comprising:
an optical transceiver component comprising a laser diode drive, a laser diode, a current adjusting unit, and an OTDR control unit;
wherein the laser diode drive is connected to the laser diode, and is configured to drive the laser diode to transmit data light according to an input data signal;
the current adjusting unit is connected to the laser diode, and is configured to modulate an OTDR test signal to the data light transmitted by the laser diode by adjusting a current flowing through the laser diode, wherein the OTDR control unit is configured to provide the OTDR test signal for the current adjusting unit, wherein the current adjusting unit comprises a first resistor, a controlled switch, and a second resistor; the first resistor, the controlled switch, and the second resistor are serially connected to form a series-connected branch circuit; the series-connected branch circuit is connected to the laser diode in parallel, and the controlled switch is configured to control an opening/closing status of the series-connected branch circuit according to the OTDR test signal provided by the OTDR control unit.

* * * * *

UNITED STATES PATENT AND TRADEMARK OFFICE
CERTIFICATE OF CORRECTION

PATENT NO. : 8,780,340 B2
APPLICATION NO. : 13/693657
DATED : July 15, 2014
INVENTOR(S) : Li et al.

It is certified that error appears in the above-identified patent and that said Letters Patent is hereby corrected as shown below:

Title Page, item [71] Applicant, "Guangdong (CN)" should read -- Shenzhen (CN) --.

Signed and Sealed this
Twenty-fifth Day of November, 2014

Michelle K. Lee
*Deputy Director of the United States Patent and Trademark Office*